May 18, 1937.　　　H. FELDMEIER ET AL　　　2,080,537
PROCESSING VAT
Filed Dec. 6, 1935　　　3 Sheets-Sheet 1
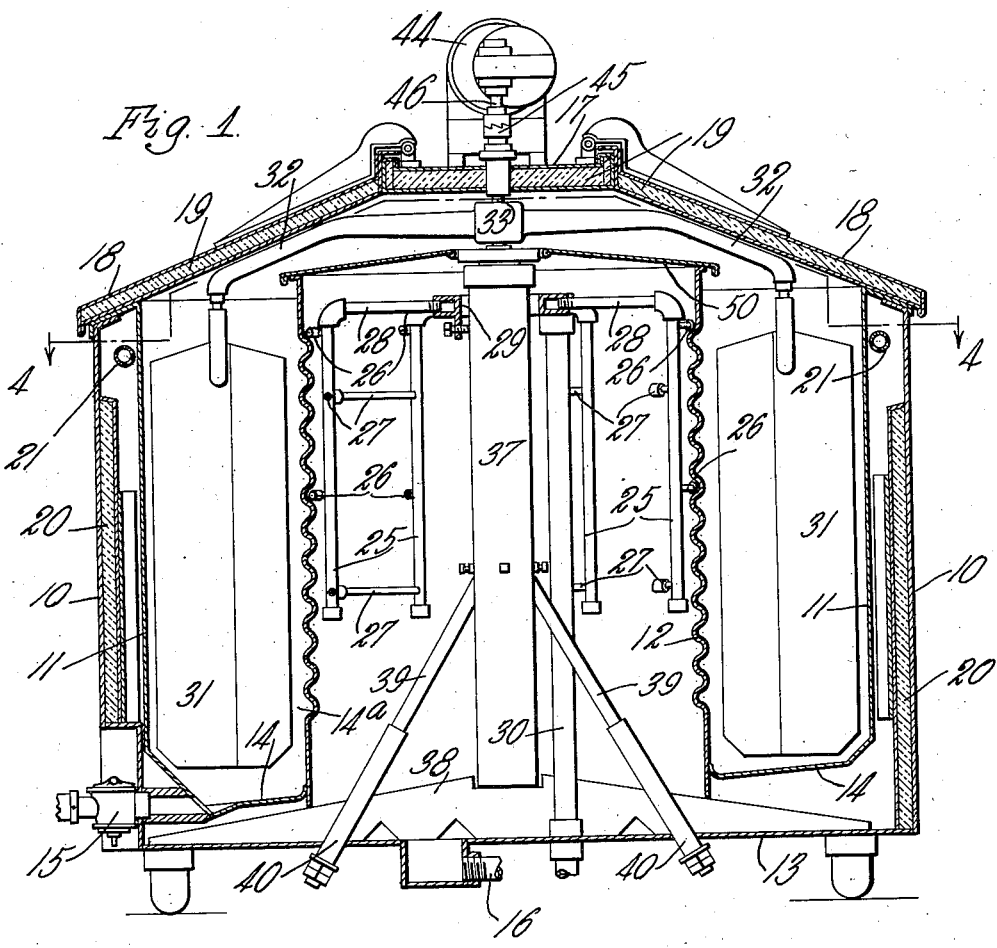
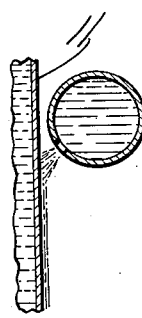

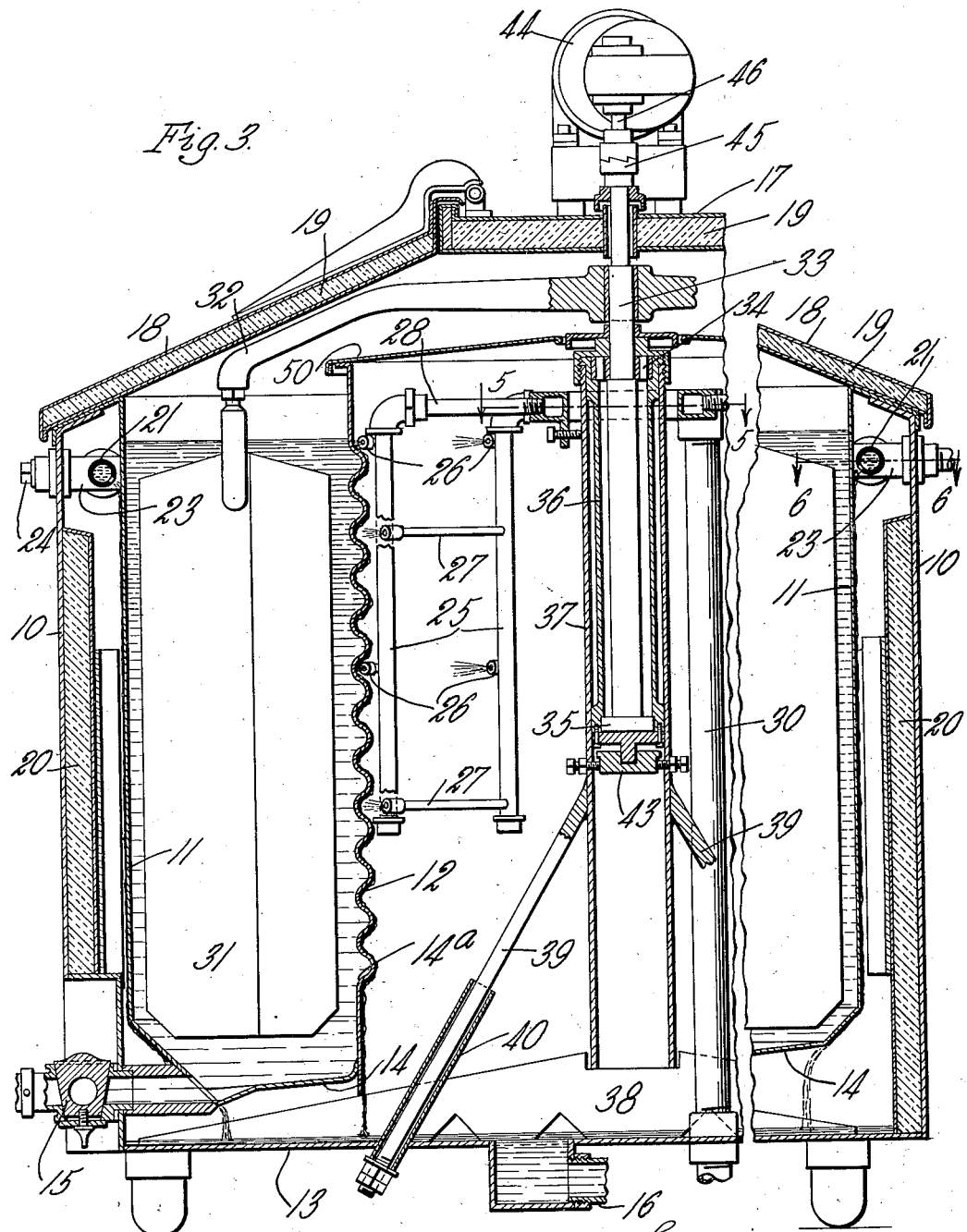

May 18, 1937. H. FELDMEIER ET AL 2,080,537
PROCESSING VAT
Filed Dec. 6, 1935 3 Sheets-Sheet 3

Patented May 18, 1937

2,080,537

UNITED STATES PATENT OFFICE 2,080,537

PROCESSING VAT

Harvey Feldmeier, deceased, late of Little Falls, N. Y., by Lela L. Feldmeier, executrix, Little Falls, N. Y., and Ellsworth Wyman, Little Falls, N. Y., assignors to Cherry-Burrell Corporation, Wilmington, Del., a corporation of Delaware Application December 6, 1935, Serial No. 53,266

10 Claims. (Cl. 257—109)

This invention relates to improvements in treating or processing vats of the sort employed, for instance, for heating, cooling or holding at a desired temperature the contents of the vat by means of a heating or cooling medium which is applied so as to effect an exchange of heat between the same and the contents of the vat.

Such apparatus, of which the horizontal spray vats, horizontal and vertical coil vats and combined coil and spray vats, are well known types, are used, for instance, for heating, cooling, holding or pasteurizing and mixing operations on milk, cream and other dairy products. These different types of vat apparatus have different features or characteristics, giving each a following, or making one preferred or more suitable for one purpose or in one plant, while another type is preferred or better suited for another purpose or plant. In the horizontal spray vat, which is usually of horizontally elongated rectangular form, the contents of the vat are treated by a temperature changing medium sprayed against and caused to flow externally over heat conducting walls of the vat; and the horizontal coil vat is more or less similarly shaped, but has a horizontal, rotating coil therein through which the heating or cooling medium circulates. These and the horizontal combined spray and coil vats are efficient in operation and have certain well recognized features of advantage, but one objection to them is that they require much greater floor space than the vertical coil vats which have a vertical rotating coil for the circulation of the heating or cooling medium. Thus, the vertical coil vat has the advantage of occupying less floor space, but the coil vats, both vertical and horizontal, are more complicated and costly and less durable than the spray vats because of the necessity for rotatably mounting the coils, the coil rotating gearings or mechanisms and the stuffing boxes required between the rotating coils and the supply and discharge connections thereto for the temperature changing medium.

One object of our invention is to provide a processing or treating vat which combines the advantages of the well known spray vat and of the vertical coil vat but obviates recognized objections in these known types of vats.

Other objects of the invention are to provide a novel processing or treating vat which gives approximately the same saving of floor space as the known vertical coil vats but is of much simpler and more durable construction; which is more accessible for cleaning than the known vertical or other coil vats; which avoids the necessity for considerable mechanism, such as heavy supporting bearings, stuffing boxes and gearing required in the coil vats; which is less costly than either vertical or horizontal coil vats; which has improved agitating means that will insure proper agitation and mixing of the material being treated, and which is capable of being easily changed for handling different products; which has a greater area of heat transfer surface than previous constructions of commensurate size; which has improved spray means for the temperature changing liquid that will insure a better and more uniform flowing film of the liquid over the heat transfer surface; and which has the other features of advantage and improvement hereinafter described and set forth in the claims.

In the accompanying drawings:

Fig. 1 is a vertical, sectional elevation of a processing or treating vat of one construction embodying our invention.

Fig. 2 is a sectional view showing a portion of the vat lining and one of the spray pipes for spraying the temperature changing liquid thereon.

Fig. 3 is a broken, vertical sectional elevation of the apparatus on a larger scale than Fig. 1.

Figure 4:
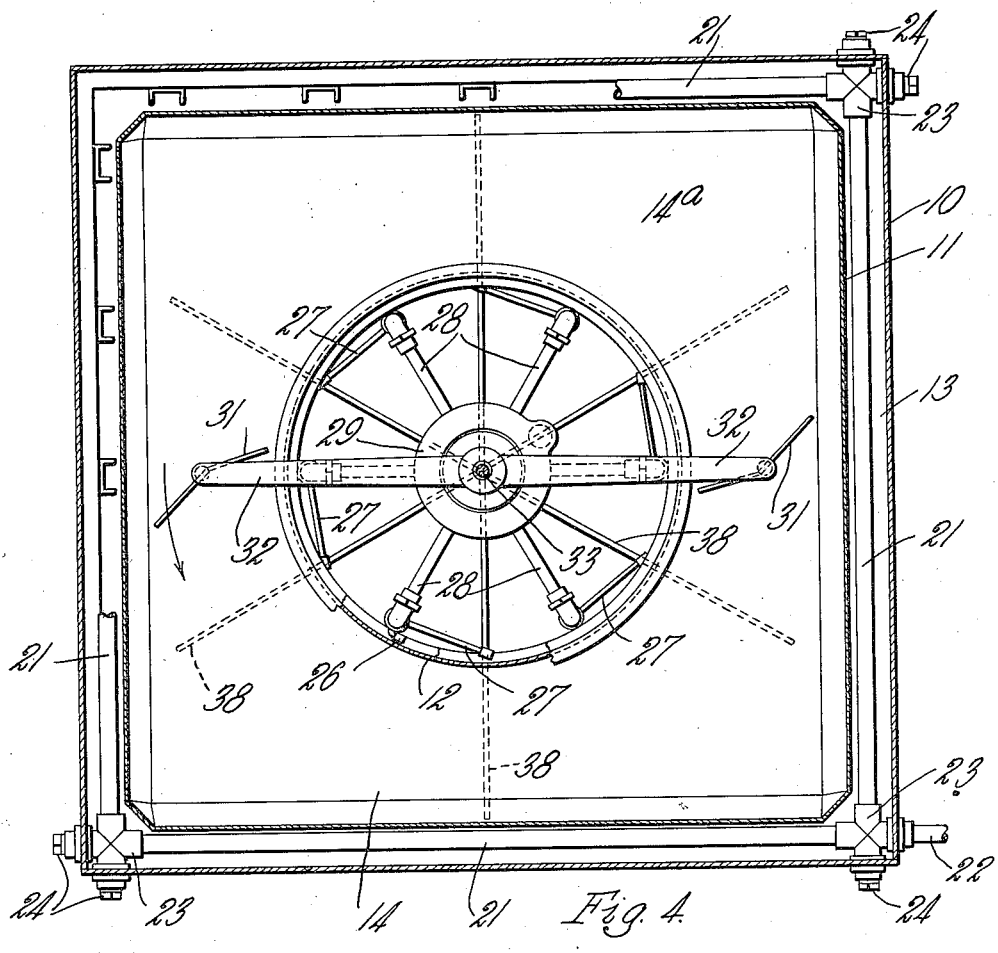
Fig. 4 is a sectional plan view of the apparatus on line 4—4, Fig. 1.
Figure 5:
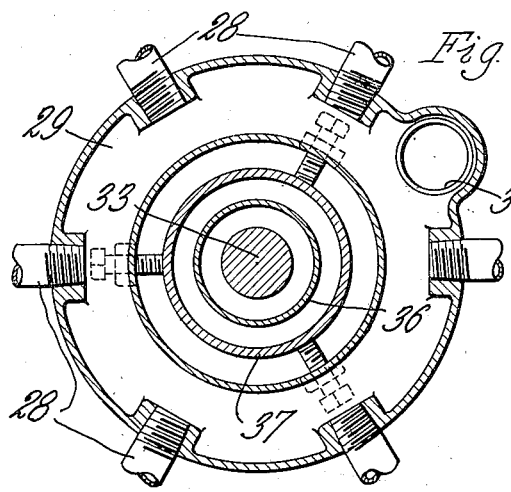
Fig. 5 is a sectional plan view on line 5—5, Fig. 3, of the distributing device for the temperature changing liquid.
Figure 6:
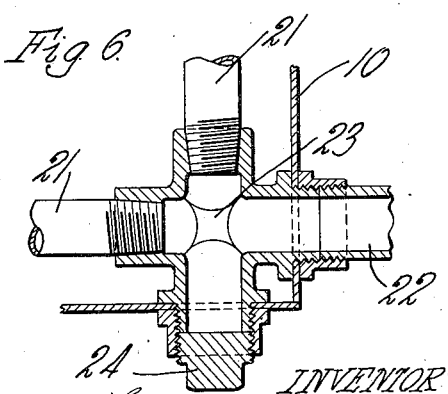
Fig. 6 is a sectional plan view, enlarged, on line 6—6, Fig. 3, showing the spray pipe connections at one corner of the vat.

The vat or container for the milk or other liquid or material to be treated comprises an outer heat insulating jacket or casing 10, a lining 11 of suitable metal or material having the requisite heat conductivity and which is arranged within and spaced from the walls of the outer jacket or casing 10, and a central upright drum or wall 12 preferably of cylindrical form and made of suitable heat conducting metal or material. This central wall is preferably formed with horizontal, circumferential corrugations, as shown in Figs. 1 and 3. The outer casing has a bottom 13, and the lining or vat proper has an annular bottom 14, above and spaced from the casing bottom 13, which connects the lower ends of the vertical outer walls 11 and drum 12 of the lining. Preferably, the outer casing or jacket 10 and the lining 11 are square or rectangular in plan or horizontal section, and the upright outer walls 11, drum 12 and bottom 14 of the lining form an annular chamber or container 14a for the body of liquid or material to be treated, said chamber having a cylindrical or upright circular inner peripheral wall and an outer peripheral wall of square or straight sided form in plan, the inner peripheral diameter of the chamber being about one-half that of the outer diameter. The bottom 14 of the lining preferably inclines downwardly from one side of the vat to the opposite side so as to drain toward the latter side, at which is located a valved outlet pipe or fitting 15 for the discharge of the contents of the lining. The outer casing or jacket is provided with a bottom discharge pipe or connection 16.

The outer side walls of the lining 11 and the side walls of the jacket 10 may be joined at their upper ends, as shown, or in any other suitable manner to close the upper end of the space between the side walls of the jacket and lining. As shown, the upper end of the vat is covered by a stationary horizontal bridge or cover portion 17 crossing the vat from one end wall to the other of the casing between its sides, and movable covers or lids 18 which are suitably hinged to the bridge 17 and incline downwardly from opposite sides of the bridge to the top edges of the opposite side walls of the jacket or casing, these covers extending from one end of the vat casing to the other so that when they are closed, the bridge and covers 18 will properly close the upper end of the vat. The side walls, movable covers 18 and bridge 17 are made of suitable insulating construction to afford proper heat insulation for the vat lining. For instance, the bridge and hinged covers 18 are made hollow and filled with suitable heat insulating material 19, and the side walls of the jacket or casing are lined with suitable heat insulating slabs 20.

For cooling or heating the contents of the annular vat lining, means are provided for causing films of temperature changing liquids to flow over the outer surfaces of the side walls 11 and drum 12 of the lining. As shown in the drawings, a spray pipe 21 is arranged in the upper portion of the space between each side wall 11 of the lining and the adjacent side of the jacket 10. These spray pipes 21 are connected with each other and to a supply pipe 22 for the temperature changing liquid by cross-shaped connections or fittings 23 at the corners of the vat, which fittings provide nipples or branches extending out of the casing at each side thereof, and these branches, with the exception of that one to which the supply pipe is connected, may be closed, as by screw plugs 24, thus adapting the supply pipe to be connected at one corner at any side of the vat, as may be desired. The spray pipes 21 are provided at the sides thereof facing the lining 11 with perforations through which the liquid is discharged or sprayed on to the upper portions of the outer surface of the lining, so as to cause the liquid to flow in films downwardly over the outer surface of the lining into the bottom of the outer jacket from which the liquid can discharge through the bottom outlet 16 of the jacket or casing.

The means shown for spraying the temperature changing medium on the drum 12 comprise vertical pipes 25 arranged within the drum at intervals around the axis of the drum, and provided with discharge nozzles directed so as to discharge substantially tangentially or circumferentially against the circular drum. As shown, each pipe 25 is located close to the drum and is provided with spaced short nozzles 26 which discharge jets tangentially or circumferentially of the drum, and at elevations between these nozzles, with long nozzles 27 substantially tangential to the drum, which discharge jets therefrom substantially circumferential against the drum at points approximately midway between the adjacent vertical pipes 25. The pipes 25 are connected at their upper ends by pipes 28 to a central annular manifold 29 to which the temperature changing medium is supplied by a pipe 30 which, as shown, extends up within the drum 12 through a suitable sealed hole in the bottom of the outer casing. The temperature changing liquid discharged from the nozzles 26 and 27 forms a liquid film on the surface of the drum 12 which flows downwardly over this surface into the bottom of the outer casing to discharge, with the liquid flowing over the lining 11, through the outlet 16. The approximately horizontal tangential or circumferential jets from the nozzles 26 and 27 cause a rotation of the liquid on the surface of the drum, and the centrifugal force thus created causes the liquid to hug or cling to the surface of the drum and spread out thereon so as to form a continuous unbroken downwardly flowing film which extends completely around the entire circle of the drum. By this arrangement of the discharge nozzles, the liquid is prevented from splashing off of the drum and forming broken or interrupted streams which do not completely cover the surface of the drum, as would be apt to occur if the liquid were not discharged circumferentially or tangentially against the drum, as explained.

As usual in spray vat apparatus, the temperature changing liquid, instead of being allowed to discharge from the bottom of the outer jacket or casing and go to waste, if desired, can be drawn from the casing by a pump which returns the liquid to the spray means after passing through suitable heating or cooling means for producing the desired temperature of the liquid, so that the liquid can be recirculated and reused.

The milk or other liquid being treated is agitated in the vat, so as to properly mix it and insure contact of all portions thereof with the heat exchange central and outer walls of the lining by stirring means which preferably comprise paddles or blades 31 arranged vertically in the annular vat and connected at their upper ends by radial arms 32 to a driven, central vertical stirrer shaft 33. Preferably, the paddles are set at an angle to the radial, with their outer edges in advance in the direction of rotation of the stirrer, as indicated in Fig. 4, so that the paddles produce a motion of the liquid in the vat toward the central wall of the vat, in addition to its circular travel in the vat. This action of the paddles in the vat having a rectangular or angular outer peripheral wall, produces a very active and thorough agitation and mixing of the material and contact thereof with the heat exchange walls of the vat. As shown, this stirrer shaft is mounted to rotate in suitable upper and lower bearings 34 and 35 in a closed removable oil housing 36 which is secured in a stationary, upright tubular column or support 37 arranged centrally of the vat within the outer casing. This column may be supported at its lower end on a spider base 38 in the bottom of the vat and may be braced by inclined brace or tie rods 39 secured to and extending from the intermediate portion of the column downwardly through sleeves 40 fixed to and extending through the bottom of the casing 10, said brace rods being provided at their lower ends with screw nuts adapted to be tightened against the lower ends of the sleeves 40 to hold the column rigidly in place. A block 43 is shown secured within the column 37 by bolts to form a support for the lower end of the bearing housing for the stirrer shaft.

The stirrer shaft may be driven by a suitable electric or other motor 44 mounted on the bridge 17 of the outer casing and suitably geared to the upper end of the stirrer shaft 33. Preferably a ratchet coupling 45 is provided between the upper end of the stirrer shaft 33 and a shaft 46 connecting it with the motor so that the stirrer blades can be turned backwardly out of the way to facilitate cleaning the vat.

50 is a cover for the upper end of the central spray chamber within the drum 12. This cover, which rests on the upper end of the drum and surrounds the agitator shaft beneath the arms 32, may be made in separate halves or sections to permit its removal to give access to the spray chamber.

The vat described is of simple and economical construction, occupies small floor space for its capacity and is efficient in operation. By making the diameter of the drum about one-half the width of the vat lining, the heat transfer surface is increased about 50%, while reducing by only about 20% the contents capacity of a vat of the same size not having the drum. As compared with a coil vat of 1000 gallons size, for example, the coil vat would be about 6½' x 6½' x 3'9" deep, against the described drum vat 7' x 7' x 4' deep. In other words, the displacement of the drum increases the length and width of the vat only about 10% so that the drum vat takes up very little more floor space than the coil vat, whereas it occupies about one-third less floor space than a horizontal coil vat of like capacity. Yet the drum vat has a much greater area of heat transfer surface, and it is a much simpler, less expensive and more durable construction, because of the avoidance of the bearings, stuffing boxes and heavy operating mechanism of the rotary coil vats, and because the sheet metal heat transfer surfaces cost much less than the tubes of the rotary coils. All surfaces with which the milk or material being treated contacts are readily accessible and can be easily cleaned, and the operator can enter the vat for this purpose when necessary. The ratchet coupling betwen the agitator shaft and motor permits the operator, while inside the vat for cleaning, to push the agitator out of his way. The use of the rotary agitator in the square or angular shaped vat with the circular central drum produces very efficient agitation because the annular vat produces a peculiar influence on the nature of the agitation by providing alternate constricted and enlarged flow spaces for the liquid in its circular travel, forming eddies in the corners. It is possible, by increasing the ratio of drum diameter to vat diameter, to rapidly increase the ratio of heat transfer surface to volume of material being treated, thus, if desired, enabling the production of vats for more rapid heating and cooling and without changing the construction of the apparatus except as to drum diameter and a few parts affected thereby. The character of the agitator blades and their speed of operation can be changed easily as may be best suited for handling different products.

The drum vat described is also adaptable for use with two kinds of temperature changing media, for instance, brine for the drum and water for the outer lining wall, in which case the drum would be provided with a bottom and a separate outlet.

We claim as our invention:

1. In an apparatus of the character described, the combination of a substantially rectangular vat having outer heat conducting walls and a standing stationary central heat conducting wall forming with said outer walls a chamber to contain a body of material to be treated, and means for directing temperature changing liquid onto the outer surfaces of said outer and central walls and causing it to flow in films over the outer surfaces of the outer and central walls of the vat.

2. In an apparatus of the character described, the combination of a substantially rectangular vat having outer heat conducting walls and a standing stationary central heat conducting wall forming with said outer walls a chamber to contain a body of material to be treated, said central wall having approximately one-half the surface area of said outer walls, and means for directing temperature-changing liquid onto the outer surfaces of said outer and central walls and causing it to flow in films over the outer surfaces of the outer and central walls of the vat.

3. In an apparatus of the character described, the combination of a rectangular vat having outer heat conducting walls and an upright central heat conducting corrugated wall forming a chamber to contain a body of material to be treated, and means for causing liquid temperature changing films to flow over the outer surfaces of the outer and central walls of the vat.

4. In an apparatus of the character described, the combination of a vat having straight outer heat conducting walls meeting at angles to each other and a standing stationary central heat conducting wall forming with said outer walls an annular chamber to contain a body of material to be treated, means for directing temperature changing liquid onto the outer surfaces of said outer and central walls and causing it to flow in films over the outer surfaces of the outer and central walls of the vat, and an agitator for the material having a paddle moving in said annular chamber.

5. In an apparatus of the character described, the combination of a vat having straight outer heat conducting walls meeting at angles to each other and a standing central heat conducting wall and forming with said outer walls an annular chamber to contain a body of material to be treated, means for directing temperature changing liquid onto the outer surfaces of said outer and central walls and causing it to flow in films over the outer surfaces of the outer and central walls of the vat, and a rotary agitator for the material having a paddle moving in said annular chamber and having its outer edge in advance of its inner edge so as to produce a motion of the material toward the center of the vat.

6. In an apparatus of the character described, the combination of a vat having upright straight outer heat conducting walls meeting at angles to each other and an upright central heat conducting drum wall and forming an annular chamber to contain a body of material to be treated, means for discharging a temperature changing liquid against the outer surfaces of said outer walls, and means for discharging a temperature changing liquid against the outer surface of the drum wall in a direction to cause circumferential flow of the liquid on the drum wall.

7. In an apparatus of the character described, the combination of a vat comprising an outer heat-insulating jacket and a rectangular heat conducting lining having outer walls spaced from the walls of the jacket and a stationary central heat conducting wall forming with said outer walls an annular chamber to contain a body of material to be treated, means in the space between the jacket and lining for spraying a temperature changing liquid on the said outer lining walls, and means for spraying a temperature changing liquid on the outer surface of said central wall.

8. A processing vat having outer heat conducting walls arranged substantially in rectangular form and a stationary inner heat conducting wall of substantially circular horizontal section, means for causing a liquid temperature changing film to flow over the outer walls of the vat, means for causing a temperature charging liquid film to flow over the outer surface of the inner wall, and means for agitating material in the chamber formed between said outer and inner walls.

9. An annular processing vat having outer heat conducting walls and a corrugated inner heat conducting wall of substantially circular horizontal section, means for causing a liquid temperature changing film to flow over the outer walls of the vat, and means for discharging a temperature changing liquid against the outer surface of the inner wall in a direction to cause circumferential flow of the liquid on said wall.

10. In an apparatus of the character described, the combination of a vat having substantially upright flat heat conducting outer walls meeting at angles to each other and an upright central heat conducting wall, said outer and central walls forming a chamber surrounding said central wall for containing a body of material to be treated, means for causing temperature changing liquid to flow in films over the outer surfaces of said outer and central walls of the vat, and a rotary agitator having a paddle moving in said chamber in a path around said central wall for causing circulation of the material in said chamber around said central wall and agitation or eddying of the material in the corners formed by said outer walls.

LELA L. FELDMEIER.
*Executrix of the Estate of Harvey Feldmeier, Deceased.*
ELLSWORTH WYMAN.